United States Patent
Boenning et al.

[11] 3,760,174
[45] Sept. 18, 1973

[54] PROGRAMMABLE LIGHT SOURCE

[75] Inventors: Robert A. Boenning; Anthony T. Nasuta, Jr., both of Baltimore, Md.

[73] Assignee: Westinghouse Electric Corporation, Pittsburgh, Pa.

[22] Filed: May 31, 1972

[21] Appl. No.: 258,376

[52] U.S. Cl.................... 240/1 R, 240/3.1, 240/20, 350/96 T, 355/70
[51] Int. Cl........................... G03b 15/02, F21v 9/00
[58] Field of Search....................... 240/1 R, 3.1, 20; 350/96 T; 355/67, 70

[56] References Cited
UNITED STATES PATENTS

| | | | |
|---|---|---|---|
| 3,093,319 | 6/1963 | Gamain | 240/3.1 X |
| 3,670,157 | 6/1972 | Bragg | 350/96 T X |
| 2,686,866 | 8/1954 | Williams | 240/3.1 |
| 3,316,804 | 5/1967 | Weisglass | 355/67 |
| 3,492,070 | 1/1970 | Zahn | 355/70 X |
| 3,143,300 | 8/1964 | Way | 240/3.1 |
| 2,306,666 | 12/1942 | Simmon | 240/1 R |

*Primary Examiner*—Richard L. Moses
*Attorney*—F. H. Henson et al.

[57] ABSTRACT

A programmable light source in which the intensity and chromaticity of the light output signal can be modulated in accordance with a predetermined program is disclosed. The output of a plurality of light emitting diodes is combined in a light funnel to produce a composite light signal. The current through each of the diodes is selectively controlled to intensity and chromatically modulate the composite signal.

8 Claims, 5 Drawing Figures

3,760,174
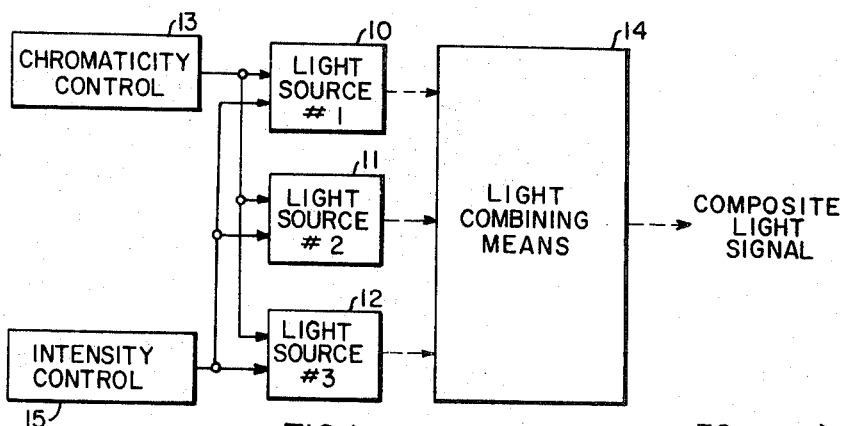
FIG.1
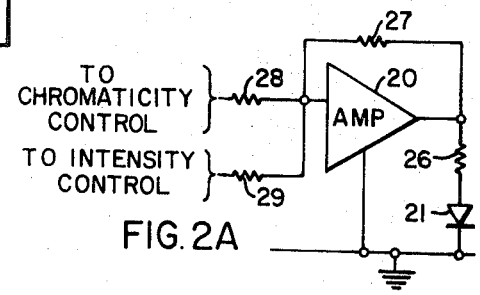
FIG.2A
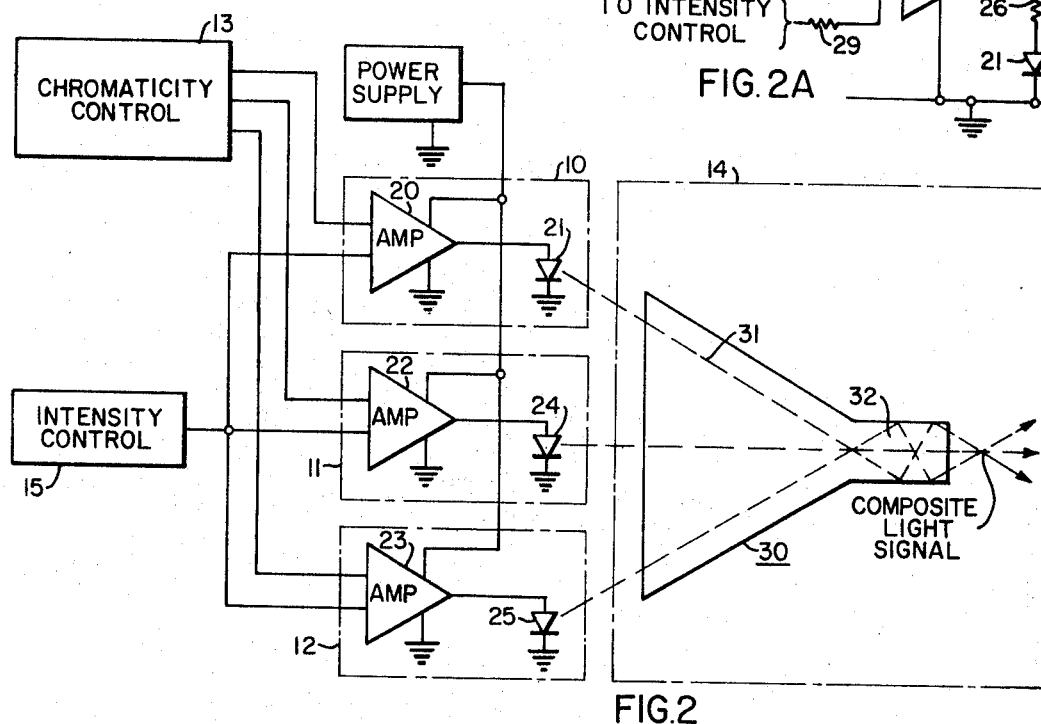
FIG.2
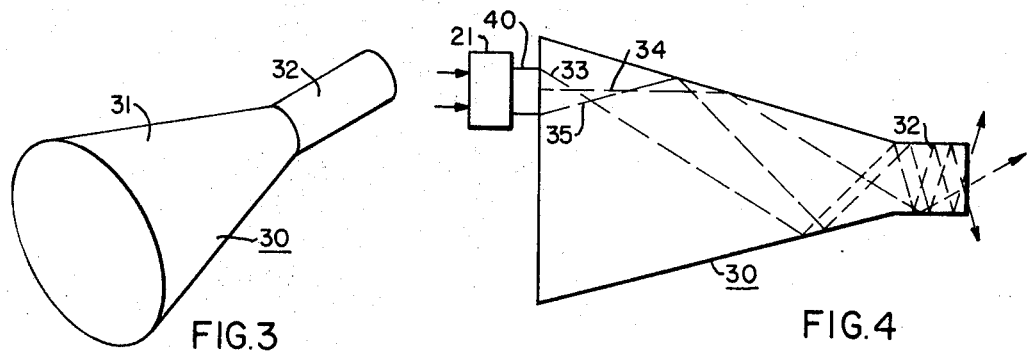
FIG.3
FIG.4

PROGRAMMABLE LIGHT SOURCE

BACKGROUND OF THE INVENTION

1. Field of the Invention

This invention relates to light sources and more particularly to light sources including means whereby the intensity and chromaticity of the light output signal can be independently modulated.

2. Description of the Prior Art

Prior art variable intensity and chromaticity light sources were not suitable for many applications because these light sources were difficult to control and in general could not be modulated at a high rate. Many of these disadvantages were related to the use of mechanical choppers, Kerr Cells or rotating crossed polariod filters as modulators.

SUMMARY OF THE INVENTION

The above discussed disadvantages are substantially overcome by the disclosed preferred embodiment of the invention which provides a light source in which the chromaticity and the intensity of the light output signal can be easily and independently modulated at a fast rate. These desirable characteristics are provided by a system which includes a plurality of solid-state light emitting diodes as the light generating elements. Each of these diodes is supplied current from a current source which is modulated in response to at least two input signals. One of the input signals to each of the current sources is supplied by the chromaticity control which is characterized such that the intensity of the light output of each of the light emitting diodes can be modulated relative to the intensity of the light output of the other diodes with the sum of the light energy radiated by all the diodes being maintained substantially constant. The other input signal to each of the current sources is supplied by the intensity control which is characterized such that the intensity of the light output signal of each of the light emitting diodes can be modulated while maintaining the relative intensity of the light emitted by each diode with respect to the other diodes substantially constant. The light output of all of the light emitting diodes is combined in a light funnel to produce a composite light output signal which is the sum of all the light emitted by the diodes. This provides a programmable light source in which the chromaticity of the composite output signal is changed by changing the relative current through each of the light emitting diodes to modulate the intensity of the light emitted by each of the diodes without substantially changing the sum of the light energy emitted by all the diodes and in which the intensity of the composite output signal is controlled by changing the current through each of the diodes to modulate the intensity of the light emitted by each of the diodes without altering the relative relationship of the intensity of the light emitted by each of the diodes with respect to each other.

The composite output signal can be used directly or additional optics may be added to the system to collimate the composite signal. The solid state diode light sources are particularly advantageous because the intensity of the light output of these diodes responds rapidly to a change in the current through the diode. This permits the intensity and chromaticity of the light source to be rapidly modulated.

BRIEF DESCRIPTION OF THE DRAWINGS

FIG. 1 is a functional block diagram of the programmable light source;

FIG. 2 is a schematic diagram of the programmable light source;

FIG. 2A is a schematic diagram of current source coupled to a light emitting diode;

FIG. 3 is a pictorial view of the light funnel; and

FIG. 4 is a cross-sectional view of the light funnel.

DETAILED DESCRIPTION

FIG. 1 is a functional block diagram of the programmable light source. Three light sources 10, 11 and 12 are included with these sources preferably emitting light radiation in the red, green and blue portions of the visible spectrum. The outputs of these light sources are combined by light combining means 14 to produce a composite light output signal. The relative intensity of the light output of each of these light sources with respect to each other is modulated by the chromaticity control 13 to control the chromaticity of the composite light output signal. The intensity control circuit 15 modulates the intensity of the light emitted by each of the light sources without changing their intensity relative to each other thereby modulating the intensity of the composite light output signal without substantially changing the chromaticity thereof. The chromaticity control 13 and the intensity control 15 operate independently thereby permitting the intensity and chromaticity of the composite output signal to be independently modulated in accordance with a preselected program.

The programmable light source illustrated in FIG. 1 is shown in more detail in FIG. 2. As shown in FIG. 2, each of the light sources 10 through 12 preferably comprise an amplifier driving a solid-state light emitting diode. For example, light source 10 comprises an amplifier 20 coupled to a solid-state light emitting diode 21. The amplifier 20 receives signals from the chromaticity control and the intensity control, 13 and 15, permitting the current through the light emitting diode 21 to be modulated so that the light output from this diode has the desired value. Similarly, light sources 11 and 12 comprise amplifiers 22 and 23 and light emitting diodes 24 and 25. The light output signals of diodes 21, 24 and 25 are combined in a light funnel 30 to produce the composite light output signal.

The chromaticity of the composite light output signal is determined by the relative intensity of the light output of each of the light emitting diodes 21, 24 and 25. For example, if these diodes, respectively, emit light in the red, blue and green portions of the visible spectrum and the relative intensity of the light emitted by each of these diodes is of the ratio defined by the ICI chromaticity diagram as white light, the composite light signal will be what is commonly referred to as white light. (The ICI chromaticity diagram is well known and can be found in most standard textbooks on light) Varying the relative intensity of the light emitted by each of the diodes 21, 24 and 25 with respect to each other permits the color of the composite light output signal to be changed. Since red, blue and green are primary colors, the relative intensity of the light output of each of the diodes 21, 24 and 25 can be selected to generate a composite light signal having any selected color within the area bounded by straight lines connecting the points on the ICI chromaticity diagram corresponding to the three diode colors.

The intensity of the composite light output signal is determined by the sum of the intensities of the light emitted by the diodes 21, 24 and 25. Since the chromaticity of the composite output signal is determined by the relative intensity of the light emitted by each of the diodes 21, 24 and 25 and the intensity of the composite output signal is determined by the sum of the intensities of the light emitted by these same diodes, the intensity and chromaticity of the composite output signal can be independently modulated.

The intensity of the light emitted by each of the diodes 21, 24 and 25 is controlled by the chromaticity control and the intensity control, 13 and 15, to generate a composite signal having the desired intensity and color. To accomplish this, the chromaticity control 13 adjusts the relative intensity of the light emitted by each of the diodes 21, 24 and 25 in accordance with a predetermined program to generate a composite signal having the desired chromatic characteristics. The intensity control 15 adjust the absolute intensity of the light emitted by each of the diodes 21, 24 and 25 without changing the relative intensity of the light emitted by these diodes with respect to each other to control the intensity of the composite signal.

A typical light source is illustrated in more detail in FIG. 2A. In this embodiment, amplifier 20 is a high gain operational amplifier. Two input resistors, 28 and 29, provide input terminals for receiving signals from the chromaticity and intensity controls, 13 and 15. A feedback resistor 27 stabilizes the gain of amplifier 20 to assure that the voltage across the series combination of resistor 26 and diode 21 has a predetermined linear relationship to the output signals of the chromaticity and intensity controls, 13 and 15. Resistor 26 is chosen such that the voltage drop across this resistor is a large percentage of the output voltage of amplifier 20. This assures that the change in the voltage drop across diode 21 with a change in current does not substantially effect the relationship between the current through this diode and the input signals to the amplifier 20.

In the above embodiment the suitable light emitting diodes 21, 24 and 25 can be purchased from Monsanto Incorporated. Amplifiers 20, 22 and 23 may be integrated circuit operational amplifiers type No. SN 52107 manufactured by Texas Instruments Incorporated.

A more detailed view of the light funnel 30 is illustrated in FIG. 3. The light funnel 30 comprises a body portion 31 substantially shaped like a truncated cone and a cylindrical neck portion 32. The light funnel 30 is made of transparent material such as acrylic or glass and the outer surfaces of the funnel are highly polished. The light funnel 30 is positioned with respect to the light emitting diodes 21, 24 and 25 such that substantially all of the light emitted by these diodes enters the light funnel 30 along the larger end of the truncated cone portion 31. The dimensions of the truncated cone portion are chosen such that light entering the funnel 30 at the large end of the truncated cone portion is reflected back and forth due to total internal reflection and emerges from the funnel at the end of the cylindrical neck portion 32. FIG. 4 illustrates how typical light rays 33 through 35, emitted by a typical light emitting diode 21, are transmitted through the light funnel 30 by way of these total reflection paths. Although only one light emitting diode 21 is illustrated in FIG. 4, diodes 24 and 25 are similarly positioned with the light emitted by these diodes being transmitted through the light funnel 30 along similar total reflection paths. As previously discussed, the composite output signal can be collimated by additional (not illustrated) optics if desired.

FIG. 4 also illustrates how a typical light emitting diode 21 can be coupled to the light funnel 30 so that minimum light energy is lost in the coupling process. A minimum light loss path is achieved by placing a coupling section 40 between the light emitting diode 21 and the optical funnel 30. The material for the coupling section 40 is chosen such that its index of refraction closely matches that of the light emitting diode 21 and the light funnel 30. The light emitting diode 21, the coupling section 40 and the light funnel 30 can be held in position mechanically, by clamps for example, or they may be secured together by an adhesive. If an adhesive is used its index of refraction should closely match that of the other components. All the other light emitting diodes can be similarly coupled to assure maximum efficiency of the system. The light emitting diodes 21, 24 and 25, may also be mounted in direct contact with the light funnel 30 if the shape of the light emitting surface of the diodes makes this arrangement convenient.

Other types of light combining apparatus could also be used. The light funnel is intended to be only one example. A truncated pyramid could be used rather than the truncated cone. Other modifications of the programmable light source are also possible.

We claim as our invention:

1. A programmable light source, comprising in combination:
   a. a plurality of light sources for generating a plurality of light signals;
   b. first means for combining said plurality of light signals to produce a composite light signal;
   c. second means for selectively and independently modulating the intensity of each of said light signals such that the chromaticity and the intensity of said composite light signal are independently and selectively changed.

2. A light source in accordance with claim 1 wherein said first means for combining said plurality of light signals comprises a light funnel formed by a truncated cone shaped member of optically transparent material with the outer surface of said member being highly polished, said light funnel being positioned such that said plurality of light signals enter the larger end of said funnel and said composite light signal emerges at the smaller end thereof.

3. A light source in accordance with claim 2 wherein each of said plurality of light sources comprises a solid-state light emitting diodes.

4. A light source in accordance with claim 3 wherein the intensity of the output signal of each of said light sources is selectively controlled by varying the current through the light emitting diode producing each of said light signals.

5. A light source having variable intensity and chromaticity, comprising in combination:
   a. a plurality of light sources for generating a plurality of light signals each of said light sources comprising a light emitting diode;
   b. first means for combining said plurality of light signals to produce a composite light signal; and c. second means for selectively modulating the intensity of said light signals thereby selectively controlling the chromaticity and the intensity of said composite signal.

6. A light source in accordance with claim 5 wherein said plurality of light sources includes at least three solid-state diodes for emitting light radiation in the red, blue and green portions of the visible spectrum.

7. A light source in accordance with claim 5 wherein said means for combining said plurality of light signals comprises an optically transparent truncated cone shaped member having polished outer surfaces.

8. A light source in accordance with claim 7 wherein said plurality of light signals are efficiently combined to form said composite light signal as said light signals pass through said truncated cone shaped member due to total internal reflection at the curved surfaces of said truncated cone shaped member.

* * * * *